(12) United States Patent
Wang

(10) Patent No.: US 9,380,750 B2
(45) Date of Patent: Jul. 5, 2016

(54) AUTOMATIC WATER SPRINKLER REGULATOR

(71) Applicant: King Yuan Wang, Taichung (TW)

(72) Inventor: King Yuan Wang, Taichung (TW)

(73) Assignee: YUAN-MEI CORP., Taichung (TW)

( * ) Notice: Subject to any disclaimer, the term of this patent is extended or adjusted under 35 U.S.C. 154(b) by 493 days.

(21) Appl. No.: 13/815,192

(22) Filed: Feb. 8, 2013

(65) Prior Publication Data

US 2014/0229024 A1 Aug. 14, 2014

(51) Int. Cl.
G05D 11/00 (2006.01)
A01G 27/00 (2006.01)
A01G 25/16 (2006.01)

(52) U.S. Cl.
CPC ...................... *A01G 25/165* (2013.01)

(58) Field of Classification Search
CPC ................ A01G 25/16; A01G 25/165; G05B 2219/2625; B05B 12/02
USPC .................. 700/284; 239/69–70, 99
See application file for complete search history.

(56) References Cited

U.S. PATENT DOCUMENTS

| 5,023,787 | A | 6/1991 | Evelyn-Veere | |
|---|---|---|---|---|
| 5,229,937 | A | 7/1993 | Evelyn-Veere | |
| 5,251,153 | A | 10/1993 | Nielsen et al. | |
| 6,823,239 | B2* | 11/2004 | Sieminski | 700/284 |
| 7,266,428 | B2* | 9/2007 | Alexanian | 700/284 |
| 7,444,207 | B2* | 10/2008 | Nickerson et al. | 700/284 |
| 7,596,429 | B2* | 9/2009 | Cardinal et al. | 700/284 |
| 8,160,750 | B2* | 4/2012 | Weiler | 700/284 |
| 8,660,705 | B2* | 2/2014 | Woytowitz et al. | 700/284 |
| 2003/0093159 | A1* | 5/2003 | Sieminski | 700/12 |
| 2006/0293797 | A1* | 12/2006 | Weiler | 700/284 |
| 2013/0173070 | A1* | 7/2013 | Tennyson et al. | 700/284 |
| 2014/0195059 | A1* | 7/2014 | Weiler | 700/284 |
| 2015/0045973 | A1* | 2/2015 | Marsters et al. | 700/284 |

OTHER PUBLICATIONS

Rain Bird; ESP-SMT Smart Modular Control System; Operation Guide Addendum and Frequently Asked Questions; 12 pages; 2011.*

* cited by examiner

*Primary Examiner* — Ronald Hartman, Jr.

(74) *Attorney, Agent, or Firm* — Raymond Y. Chan; David and Raymond Patent Firm

(57) ABSTRACT

An automatic water sprinkler regulator is provided to control sprinkler coverage and times for water cycles. The regulator comprises control interface, series of control buttons, water inlet part, water outlet part, control processor. An improvement made in the present invention focuses on rendering a control interface with multiple approaches to control times for water cycles to make for a controller interface that can be set for irrigating by way of a series of control buttons.

5 Claims, 4 Drawing Sheets

AUTOMATIC WATER SPRINKLER REGULATOR

BACKGROUND OF THE INVENTION

1. Field of the Invention

The water sprinkler regulator of the current invention provides the following advantages in the interest of controlling an irrigation system; said advantages include adaptable control settings for watering times, and more preferred setting for waiting time for post-watering water infiltration in soil. The above design aims to save water supply, reduce redundant watering time, in order to improve over conventional arts on the issue relating to irrigation time adjustment limited to be available only within a fixed time cycle. By way of a more expensive adjustment control for watering time, the irrigated area would be able to more effectively absorb water, and essentially sufficient water content, and as a result the soil can be saturated by water infiltration. This design can prevent, after one watering cycle, irrigation area loss due to water spillage as a result from the soil not being able to absorb water in a short time period, which therefore can minimize waste on water.

2. Description of Related Art

With respect to watering for the irrigation purpose, manual-labor-intensive irrigation can be used to make up for the shortcoming of water shortage in plantation region due to insufficient rain or prolonged exposure to sun bath. Supplying water by labor irrigation for a predetermined watering time to a water-devoid region can be adjusted to provide vegetation more sufficient amount of water depending the requirement for the region.

However, in response to the growing trend in increased work complexity, labor irrigation has gradually been replaced by automatic water sprinkler regulator. Currently available automatic water sprinkler regulator can control batched water supply on a period basis, and has a response time corresponding to a remote control monitored vegetation watering, which is so designed to avoid water supply break-up when vegetation is often water-filled during a raining scenario. Finally, the way an automatic water sprinkler regulator is configured is to accommodate a control setting that can be accepted to the general public, and room for improvement for such design is directed to simplifying the control setting for the regulator. Currently, the most advanced irrigation regulator often comes with watering time adjustable timer. These systems make for an automatic irrigation device, and this irrigation device can be built from conduit parts of an automatic irrigation device to be configured to include multiple watering stations, regions, or etc. as a means to automatically control water flow volume from a water source.

Watering settings for automatic water sprinkler of this kind is usually set to fixed cycle and frequency, this regular watering period is timed on an automatic response schedule for irrigating specific vegetated land. For this kind of machine, it works to select a specific time frame for irrigation based on the fixed cycle, which may be: 1. keeping the watering frequency constant for each week, 2. keeping the watering duration constant, 3. keeping the watering time and its duration constant for each day However, vegetated land can come in a variety of different sizes, some land is sloped, and the heights of these slopes are not necessarily the same. For houses built on hills, for example, the vegetated land slope that they are built on is a bit steep. If the slope is steep, the water originating from the watering could run off very quickly due to the effect of the slope after a fixed, lengthy watering time, which may require more water for watering if one intends to make the land to absorb water completely, which can potentially lead to waste of water. As for owners with flat lands, although water loss may less likely happen, there might be other problems including overwatering and therefore oversaturated land as a result of fixed watering time. Even more, other probable problems include overly excessive amount of water overflowing from the vegetated land area and flowing into ditches, or overly excessive amount of water generated over the vegetated area to create water puddles;

Furthermore, the quality of the soil differs from one place to the next, it may be possible that the content ratio of sand in the soil in one place is higher, and the water uptake amount in the soil is faster, so the watering duration may be longer and the wetting time after intermittent watering does not necessarily have to be particularly long; for this kind of land, its water intake speed is slower, so the wetting time for it after intermittent watering has to be longer, and the watering time has to be reduced in order to provide the land a longer water intake duration.

As a result, fixed-time watering cycle cannot provide water effectively to the soil of this vegetated area, due to the restrictive nature of the fixed cycle and fixed watering duration, these watering duration and waiting for stopping watering time cannot be freely adjusted accordingly.

What the consumers of the modem society needs is a watering time setting that allows more flexibility, for example, one that can be customized to cover activities including start time, adjustable watering duration, and even adjustable wetting time, on a daily, weekly, multiple days, even more days' basis.

As a result, apparently, settings for watering amount for irrigation controller as an improvement with the current invention can provide a solution to the conventional problem, which can resolve the deficiency in the fixed watering setting in the conventional technology, and can provide never-before-seen advantages, which encompass obvious inventiveness in the current field of technology.

More specifically, a main object of the present invention is to provide an irrigation controller, which can allow a watering controller to be configured in a simple manner to flexibly set for watering time and wetting time, which can provide an irrigation controller, permitting multiple watering modes. The watering modes may include adjustable multi-tiered watering mode and watering duration, the wetting duration may also be controlled by an adjustable variable set.

SUMMARY OF THE INVENTION

The key characteristics of the present invention involves the formal programming for watering command, and the settings with respect to making the watering time for each irrigation station more flexible and effective. As described previously, each appointed total irrigation time can go on to a "re-segmented" setting, for which the sum of each re-segmented watering time would not go over "the total time for irrigation." It is possible with the current invention to re-set the "segmented watering time" when setting each total irrigation time, and it is also possible to set a "wetting time" in addition to the setting of watering time, therefore this means that each irrigation time can be further segmented, and the so-called "segmented watering time" and "wetting time" can be freely adjusted;

By the above, the described segmented watering time is cited on a per-minute basis, the segmented watering time can be adjusted freely, and wetting time can be brought into the action in the time between segments. The wetting time is also taken on a per-minute basis, which can be freely adjusted. As will be discussed, the segmented watering time and wetting time that together form a watering time cycle is flexibly used to set the irrigation time, and it can be separated configured for different regions. As a result, user would only need to specify an irrigation time once, and then propose a watering plan in consideration of the irrigation terrain, during which the user considers whether to go on with a more detailed plan for segmented watering in the irrigation area depending on the topography and land area, and the same for wetting time, also to a flexible extent.

Simple programming for watering command is implemented for the recyclable mode of programming for watering. Topography of the land to be irrigated is taken into consideration for setting the wetting time. The watering setting does not have to be planned and programmed by dedicated professional companies, the entire watering setting is focused on being easily customizable by regular consumers, through the least complicated handling of watering mode. The cited process can be set based on eye inspection of the land terrain. If after a first-timer setting, it is found that watering time and wetting stand-by time cannot effectively meet a required time, the watering time can be adjusted accordingly, and shorter time or longer time may be used for adjustment, until all the required watering setting satisfy a desired water content in the land proposed to be irrigated, and the land is saturated with water, and it does not spill over out of the irrigated land.

DETAILED DESCRIPTION OF THE PREFERRED EMBODIMENT

Figure 1:
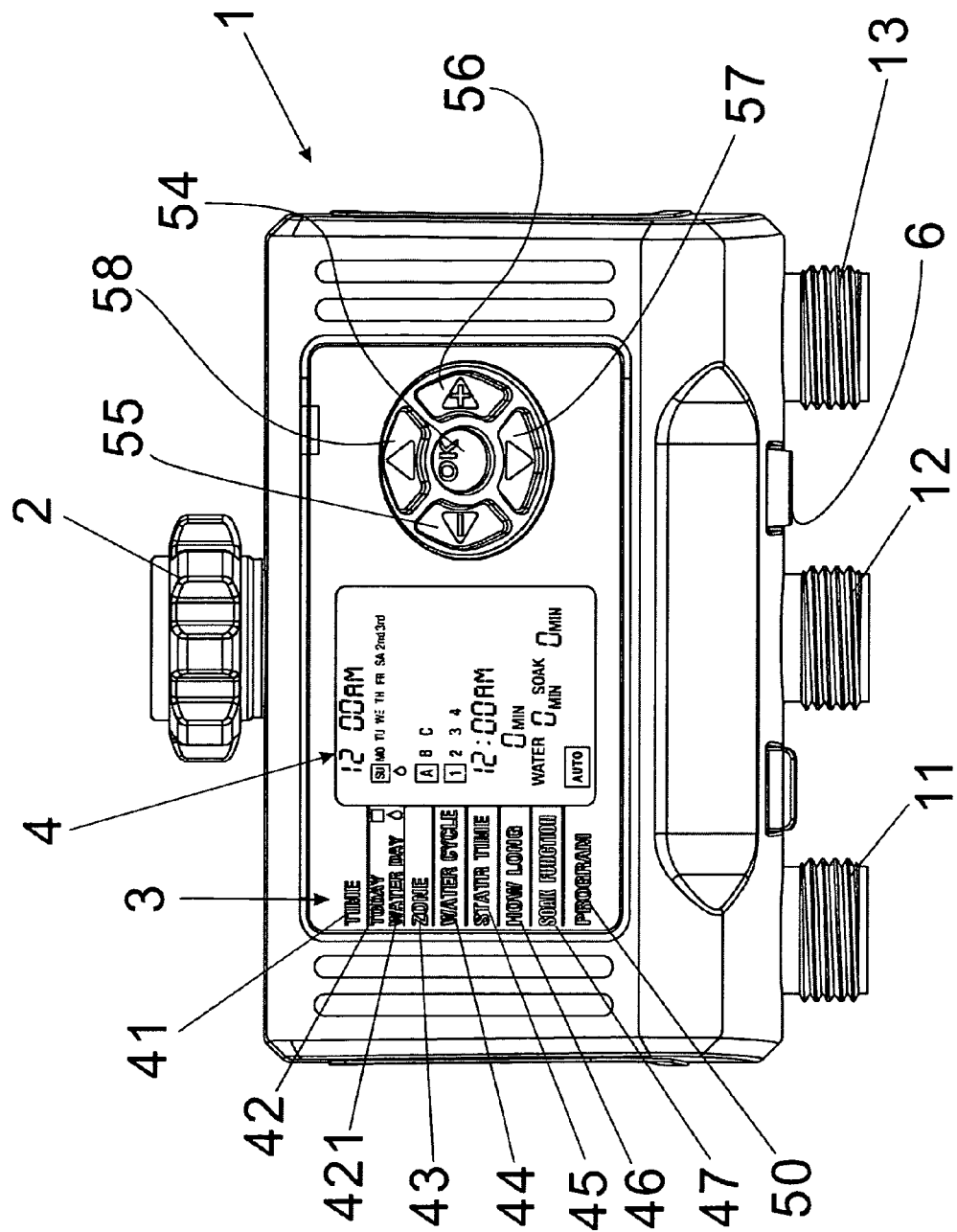
FIG. 1 is a frontal view of a water sprinkler regulator of the present invention.

The water sprinkler regulator depicted in FIGS. 1, 2, 3, 4 comprises:

(a) a frame A, comprising: a regulator case 1, a power supply storage space 6, an irrigation control processor;

(b) the irrigation control regulator (not shown in the Figures) is installed in the regulator case 1, embedded in the irrigation control process and irrigation control parameter of the setting interface MENU, and a timer, which can be connected by electrical circuit to a water inlet part 2 and multiple water outlet parts 11, 12, 13, so as to control the opening and closing of the valve;

(c) a display interface 4, which is installed on a surface of the cited regulator case, the back-side electrical circuit is connected to the irrigation control processor;

(d) the power supply storage space is coupled to the cited irrigation control processor (not shown in FIGs.), and provides the only source for electrical power to a working station for the cited irrigation control processor and the cited buttons, display interface device, valve switch;

(e) an input button for configuring for watering mode, the input button comprises movement button 58, 57, number addition/subtraction button 55, 56 and confirmation button 54, which can operate to mediate opening and closing, to practice cycling watering mode and watering time, and select a configuration step, the movement buttons 58, 57 are mapped to the upward-pointing button and the downward-pointing button. The cited number addition/subtraction buttons 55, 56 are mapped to the left-pointing button and the right-pointing button, the cited confirmation button 54 are mapped to be in the middle between the movement buttons 58, 57, and the number addition/subtraction buttons 55, 56. The purpose of the confirmation button is to make sure each setting step completes the setting;

(f) a water inlet part 2 and multiple water outlet parts 11, 12, 13, the cited water inlet part 2 serves to connect the terminal opening for the water source, the cited water outlet parts 11, 12, 13 are each connected to the openings of the irrigation watering nozzles, the inside of the water outlet part is internally installed with opening/closing valves for controlling water flow. The irrigation control processor (not shown in Figures) works to control the opening the closing of the respective valves 111, 121, 131 based on the chosen watering mode. The internally installed valve of the water outlet part is controlled by an electromagnetic valve. As shown by the structures depicted in FIG. 3 and FIG. 4, the electromagnetic valve comprise electromagnetic coil 134 and blocking component 132, clearance components 133. The irrigation control processor (now shown in the Figures) controls the on-circuit and off-circuit operation for the electromagnetic coil 134, so as to make the blocking component 132 block the clearance component 133 to stop water flow from spilling into irrigation, or to make the blocking component 132 to detach from the clearance component 133;

(g) the display interface 4 sets the watering control process through submitting command by button execution to the watering setting interface MENU, possible operation selection for such includes manual or automatic operation or lapsed or closed irrigation control.

There can be one or more than one of the above described water outlet part.

First, in reference to FIG. 1, a user control interface for watering regulator is provided, the process covered by the programming module 3 of the display interface shown in the Figure is, by sequential order: a. (TIME) 41 is the current time at which the timer is set; b. (TODAY) 42 is the current date on which the timer is set, which is the any day within a week; c. (WATER DAY) 421 is the customizable watering cycle, which can be configured to include the specific days of a week for watering, or by the $2^{nd}$ or $3^{rd}$ manner, automatically set the current day and after every 2 days or after every 3 days for watering cycle; d. (ZONE) 43 governs the setting for specific land area to be irrigated, for which the desired irrigated region can be specified; e. (WATER CYCLE) 44 assumes control for irrigation frequency, which works to cooperate with the watering frequency for a specific day within a week for watering in (WATER DAY) 421; f. (START TIME) 45 controls the specific time in a day to start irrigation, which can be a watering time in the morning (AM) or the afternoon (PM); g. (HOW LONG) 46 sets the irrigation duration, h. (SOAK FUNCTION) 47 manages segmented irrigation, including (WATER) 48 and (SOAK) 49, (WATER) 48 re-segmentizes the (HOW LONG) 46 watering time, it can separately set the setting into (SOAK) 49. (SOAK) 49 sets the wetting time when watering is paused, the wetting time is one resulting from the interplay between (WATER) 48 and (SOAK) 49; i. (PROGRAM) mode comprises a (AUTO) 501 automatic mode, a (DELAY) 502 delay mode, a (MANUAL) 503 manual mode, a (OFF) 504 switch; the described programming module 3 displays its text on the display panel, which is arranged on the outer edge of MENU of the display monitor in such a way to accommodate the programming order of the input command.

Figure 2:
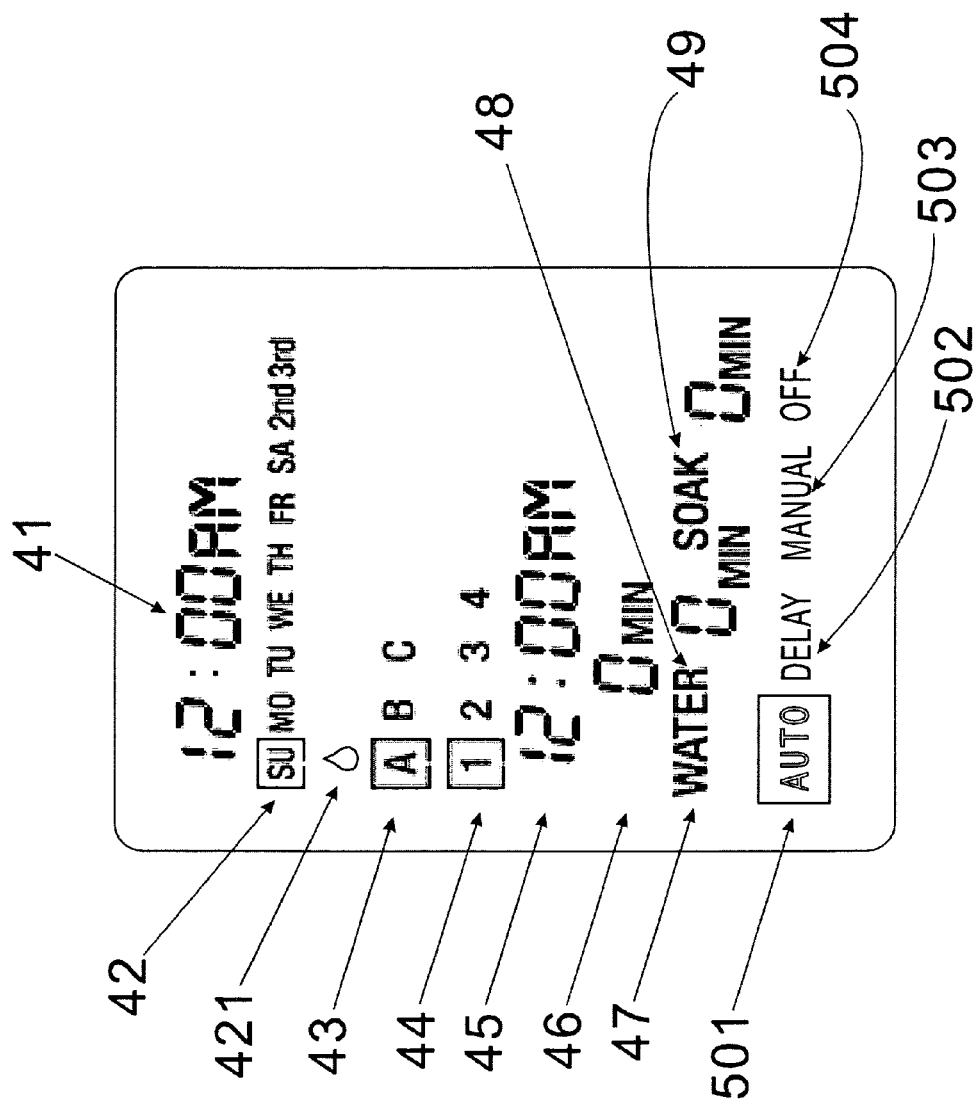
FIG. 2 represents a control interface menu on a display panel for a water sprinkler regulator of the present invention.
Figure 3:
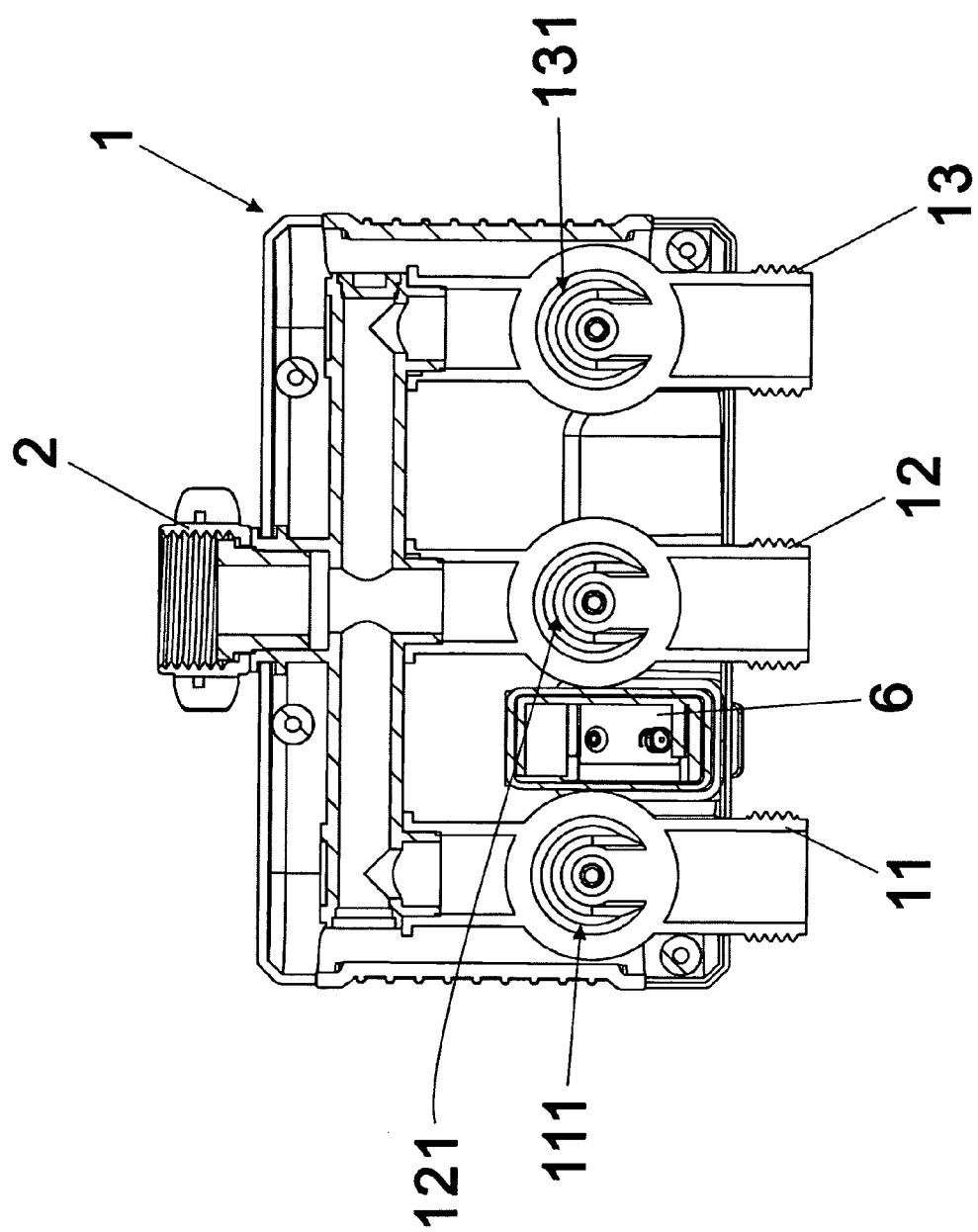
FIG. 3 is a cross-sectional showing of water inlets and water outlets for a water sprinkler regulator of the present invention.
Figure 4:
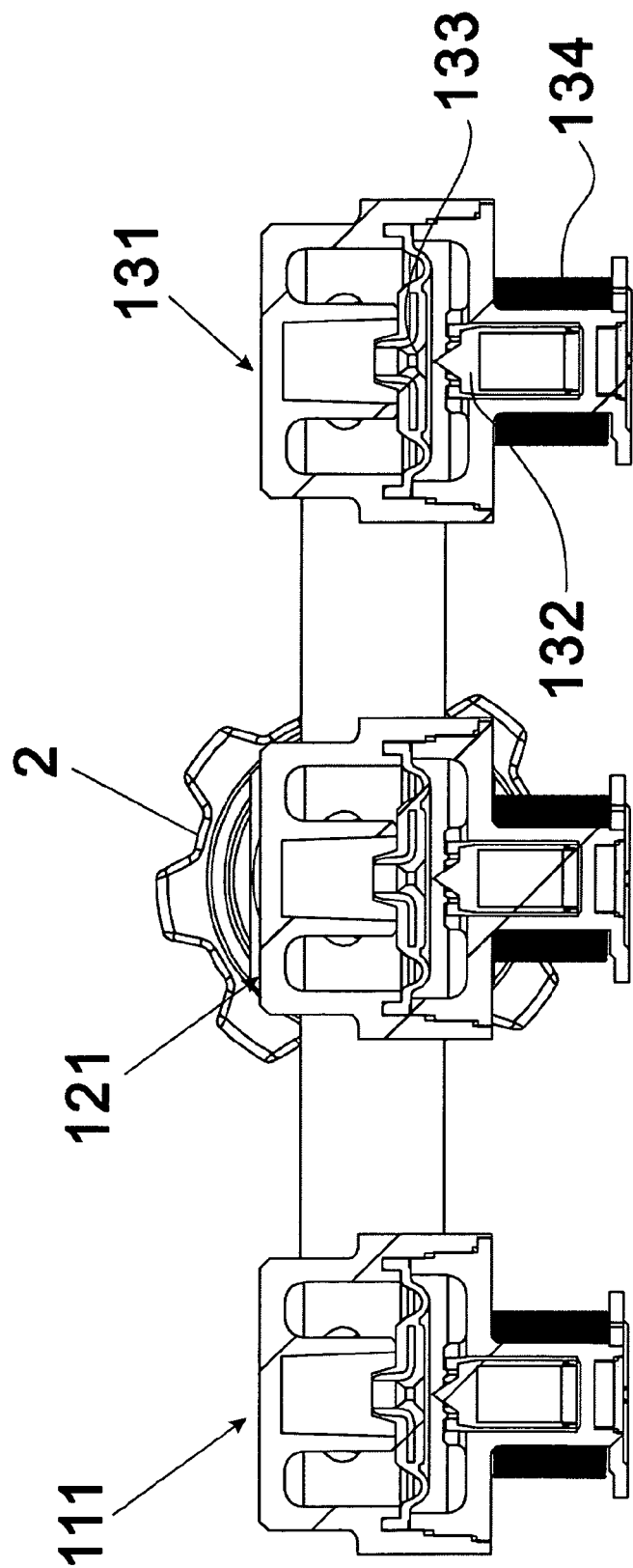
FIG. 4 shows a cross-sectional view of a water outlet valve for a water sprinkler regulator of the present invention.

The docket of the sprinkler regulator is disposed with input buttons 54, 55, 56, 57, 58, display panel 4, water inlet part 2, water outlet part 11, 12, 13, power supply storage room 6 and electrical circuit for control configuration. FIG. 2 shows the incorporation of input buttons in the display panel MENU, the input buttons 54, 55, 56, 57, 58 pops out on the case proper, the disposition is as shown in FIG. 1, the buttons include: movement buttons 57, 58, number addition/subtraction buttons 55, 56, and confirmation button (OK) 54, the backside of the button connects the electrical circuit to the control electrical circuit board, the control electrical circuit board is at the same time connected to the electrical circuit, making the control status and number display on the panel so that the command for the control parameter can be immediately shown on the display, the input command would be shown on the display panel, and the current control command would also be shown.

For control of the sprinkler regulator of the present invention, the left button 55 and the right button 56 are for selecting and adding/subtracting number, the up button 57 and the down button 58 are for moving between previous screen and subsequent screen. The confirmation button (OK) 54 is disposed in the center next to left button (−) 55, right button (+) 56, up button (▲) 58, down button (▼) 57, user can use the up button (▲) 58 and down button (▼) 57 to switch to a desired setting. If it is found that the irrigation duration 46 is set to be too long, user can still move back to the previous step to restart with a new setting, even if the confirmation button 54 has been pressed and the next step has begun. Therefore command activation by confirmation button is not required for each process, double-pressing the up button (▲) 58 or the down button (▼) 57 can work to switch between set steps.

The control system for the sprinkler timer is designed to be a MANU for a setting mode, for showing the process arrangement for the watering operation. User can customize a specific time cycle, and within the time cycle set a desired watering cycle configuration. For example, a user may set a current time for the timer (TIME) 41 according to sequential ordering; use the left and right buttons 55, 56 to execute number adding or subtracting for the number on the timer, in order to set the time on the timer 41, and press confirmation button (OK) 54 after an order has been made final, such undertaking would proceed to the second step for configuring cycle setting (TODAY) 42 and (WATER DAY) 421, the user can move using left and right buttons 55, 56, (TODAY) 42 is for setting the current time, which is the day on which the setting is being made. (WATER DAY) 421 refers to the days of a week, it also refers to, by way of a $2^{nd}$ watering or a $3^{rd}$ watering in each week, setting the automatic setting to begin calculating from the day the setting is made for the watering cycle for 2 times or 3 times in each week. In this process setting, if the setting is based on the $2^{nd}$ watering or $3^{rd}$ watering in each week, a previous setting for a specific day for watering in each week would be overridden and cancelled. More specifically, (TODAY) 42 involves the user pressing the confirmation button (OK) 54 after setting the current time for the control regulator and making the confirmation therefore, so as to proceed with the setting for (WATER DAY) 421 watering cycle. These two processes are what are to be executed in this step. If the time of setting is Monday, and the previous setting was focused on a watering cycle on a Monday, Wednesday, and Friday in a week, if such is changed to be operated in a weekly $2^{nd}$ watering mode, the previous settings would be replaced. The current time set on the time of setting would be used to automatically calculate which days to perform watering in each week in the future. Such operation would involve watering two times in each week. The previously set watering cycle for Monday, Wednesday, and Friday in a week would be cancelled.

After (WATER DAY) 421 watering cycle is completed, the watering operation would automatically enter step 3 when the user presses the confirmation button (OK) 54. Step 3 lays out the setting for the irrigation region (ZONE) 43. In the current embodiment, the setting may be set to: A, B, C zones. Separate and independent setting can be performed each of these three zones. For example, a comprehensive watering command may be set for A zone first, after completion, set for B or C. In addition, the setting for the irrigation zone (ZONE) 43 can be limited to only one irrigation zone or more than one irrigation zones. This default setting is designed in such a way to accommodate different needs by situational demand. In other words, when the user's irrigation zone is only one unit, there is no need for spending on a watering regulator adapted for more than one irrigation zones. Comparatively, only one water outlet would be included for the sprinkler regulator.

Next, after the specified irrigation region 43 is completed, the user can press confirmation button (OK) 54, step 4 would automatically begin accordingly, step 4 is for (WATER CYCLE) 44, which is for setting the number of watering in a day for a cycle. After the number of watering and the confirmation button (OK) 54 is pressed, step 5 would automatically begin to initiate irrigation time (START TIME) 45. The start time for beginning watering in a day in the set cycle would be made for this step. After the setting is done in this step and the confirmation button (OK) 54 is completed, the sixth step would begin, for which the irrigation duration (HOW LONG) 46 would be set, such involves the total watering time length for each watering operation. The watering process would proceed with weekly watering in accordance by way of the programmed setting.

One main technical feature of the current invention lies in the sixth step, segmented irrigation (SOAK FUNCTION) 47. The (SOAK FUNCTION) 47 comprises (WATER) 48 and (SOAK) 49, these are the inventive features of the current invention. Such configuration mainly focuses on providing a number of adjustable watering time settings applicable for different land slope or area size or soil quality. For example, if the land to be irrigated is a sloped terrain, then the required segmented watering time would need to be cut short, but the relative wetting time would need to be longer, so as to help land to absorb water in a gradual manner when the water flows downward; and, if the land to be irrigated is a flat terrain, the soil quality accounts for higher sand content ratio, then its water absorbance capability is relatively faster, and so there is no need for setting the wetting time. As such segmented watering setting may not required under such condition, for this situation, then only setting for (HOW LONG) 46 for the watering time would be relevant. Furthermore, if the viscosity of the soil of the land to be irrigated is relatively higher, and its slope is small, then the wetting time and segmented watering time required therefore may be equally equivalent. As such the (WATER) 48 and (SOAK) 49 may both be adjusted to be of the same time duration, segmented watering may be conducted and then followed watering suspension punctuated by wetting time. The cycle is continued until the irrigation duration (HOW LONG) 46 finishes. Pressing the confirmation button (OK) 54 when all the settings for watering time is up will bring about step 8 (PROGRAM) 50. This step involves an automatic mode (AUTO) 501, a delay mode (DELAY) 502, a manual mode (MANUAL) 503 and shut-down (OFF) 504. The user can choose to use the manual mode (MANUAL) 503 to quickly continue with the entire watering operation. The manual mode can work to detect if the time set in the watering mode can supply the irrigated land with enough water, and determine the set watering mode is fitting for the terrain and soil quality of the irrigated zone, in order to prevent excessive waste on water supply, and thoroughly understand if the time for the set (WATER) 48 and (SOAK) 49 appropriate, and to understand if there is a need for re-adjusting the time duration for (WATER) 48 and (SOAK) 49; selecting automatic mode (AUTO) 50 after the setting is done would lead to the regulator to automatically engage in cycling watering mode in the set cycle time. When required, for example in a raining scenario, the delay mode (DELAY) 502 can be chosen to postpone watering, the shut-down (OFF) 504 functionality may also be chosen for calling off the sprinkler control system for watering operation. The system can be restarted for use if switched to the automatic mode (AUTO) 501, delay mode (DELAY) 502, or manual mode (MANUAL) 503. Completion of this step is completion of the entire setting for the sprinkler regulator of the current invention.

With respect to the setting for the watering duration for the sprinkler regulator of the present invention, the setting involves unique setting for irrigation duration (HOW LONG) 46, setting for segmented watering time duration (WATER) 48 and setting for wetting time (SOAK) 49. Each irrigation time duration for (HOW LONG) 46 can be arranged with a (SOAK) 49 time duration setting. With respect to the segmented watering time duration mediated by (WATER) 48 and wetting time duration (SOAK) 49, the basic value is 0 across the board. The time setting for the segmented watering time (WATER) 48 and wetting time (SOAK) 49 can be freely adjusted starting from 1 minute and up. In other words, if a segmented watering is not required, the wetting time would not be required, and here the setting for these two steps may be set to 0, which is the same as returning back to the irrigation time duration (WATER) 48, and additional segmented irrigation time and wetting time would not be further arranged.

With regard to the irrigation cycle mode for each irrigation zone (ZONE) 43, each can be individually and separately set, each zone may have different watering cycle settings, so as to allow the user to separately set customize watering time or wetting time to adapt to the required water amount for topography, area or soil in different zones.

Other important features involve setting the processes. Setting for each irrigation time duration (HOW LONG) 46 may be skipped, and jumping ahead to setting the segmented watering time (WATER) 48 and wetting time (SOAK) 49 by (SOAK FUNCTION) 47 is possible. By this design the maneuvering for setting the watering time is more flexible. For example, when using manual control to operate watering times testing, it would be possible to timely determine the length of time required for watering for an irrigated land, as well as how much time is needed for wetting time.

What is claimed is:

1. A water sprinkler regulator, comprising an adjustable operation interface MENU for an irrigation sprinkler regulator, the interface MENU comprises:

a. TIME timer, for setting a current time according to a location where the setting is made;
   b. TODAY, for setting a current date on which the timer is set;
   c. WATER DAY for cycle, for setting a predetermined day for watering in a week or a number of times for watering in a week;
   d. ZONE for irrigation zone, for setting one or more than one irrigation zone;
   e. WATER CYCLE for number of irrigation, for setting number of irrigation on a day for watering;
   f. START TIME for start time for irrigation;
   g. HOW LONG for total irrigation time;
   h. SOAK FUNCTION for segmented irrigation, which comprises WATER segmented watering time and SOAK wetting time, wherein irrigation is achieved during the WATER segmented watering time and a watering suspension is provided during the wetting time for water absorbance, wherein a duration of the watering time and a duration of the wetting are both configured to be adjustable to adapt to a required water amount for topography, area, or soil in different zones; and
   i. PROGRAM for mode setting, which comprises an automatic mode (AUTO), a delay mode (DELAY), a manual mode (MANUAL) and shut-off (OFF).

2. The water sprinkler regulator according to claim 1, there is one or more than one ZONE irrigation zone.

3. A method for setting irrigation for a water sprinkler regulator, which comprises a watering nozzle control module, and gives effect to a manner of ordering in response to irrigation command and flexible setting for watering time for each irrigation station, comprising the steps executed by a processor of:

displaying a WATER CYCLE interface on a display panel for setting a number of times of irrigation;
   displaying a START TIME interface on the display panel for setting an irrigation starting time;
   displaying a HOW LONG interface on the display panel for setting an irrigation time duration; and
   displaying a SOAK FUNCTION interface on the display panel for setting a segmented irrigation which comprises setting a predetermined watering time and setting a predetermined wetting time for a watering suspension following the watering time, wherein during the wetting time, the irrigation is stopped for water absorbance, wherein a duration of the watering time and a duration of the wetting time are both adjustable to adapt to a required water amount for topography, area, or soil in different zones.

4. The method, as recited in claim 3, further comprising a step of setting different durations of the watering time and the wetting time via an input button for lands with different water absorbance abilities.

5. The method, as recited in claim 3, further comprising a step of setting different durations of the watering time and the wetting time via an input button for lands with different slope rates.

* * * * *